(No Model.)    5 Sheets—Sheet 1.

F. J. PATTERSON.
CASH REGISTER AND INDICATOR.

No. 450,955.                Patented Apr. 21, 1891.

Witnesses.
J. Thomson Cross
T. W. Wentworth

Inventor.
Frank J. Patterson
by Peck & Rector
Attorneys.

(No Model.)

F. J. PATTERSON.
CASH REGISTER AND INDICATOR.

No. 450,955.

5 Sheets—Sheet 3.

Patented Apr. 21, 1891.

Witnesses.

Inventor.

(No Model.)

F. J. PATTERSON.
CASH REGISTER AND INDICATOR.

No. 450,955. Patented Apr. 21, 1891.

5 Sheets—Sheet 4.

Witnesses.

Inventor:
Frank J. Patterson
by Peck & Reiter
Attorneys.

(No Model.) 5 Sheets—Sheet 5.

F. J. PATTERSON.
CASH REGISTER AND INDICATOR.

No. 450,955. Patented Apr. 21, 1891.

Witnesses.
J. Thomson Cross
G. H. Wentworth

Inventor.
Frank J. Patterson
by Peck & Reiton
Attorneys.

UNITED STATES PATENT OFFICE.

FRANK J. PATTERSON, OF DAYTON, OHIO.

CASH REGISTER AND INDICATOR.

SPECIFICATION forming part of Letters Patent No. 450,955, dated April 21, 1891.

Application filed February 24, 1891. Serial No. 382,532. (No model.)

*To all whom it may concern:*

Be it known that I, FRANK J. PATTERSON, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

The object of my invention is to simplify and cheapen the construction and increase the efficiency of this class of machines, and its novelty will be herein set forth, and specifically pointed out in the claims.

Figure 1:
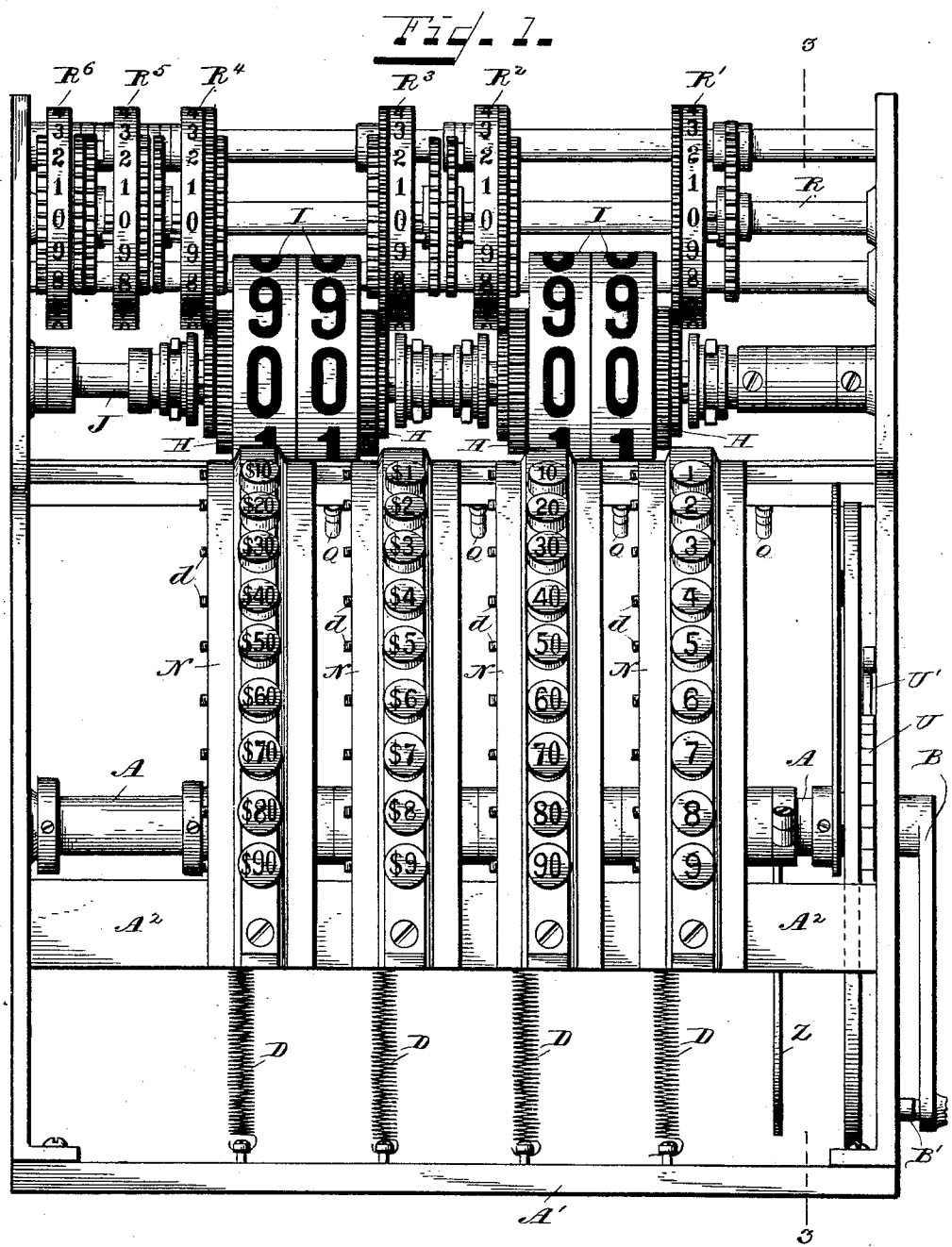
Figure 2:
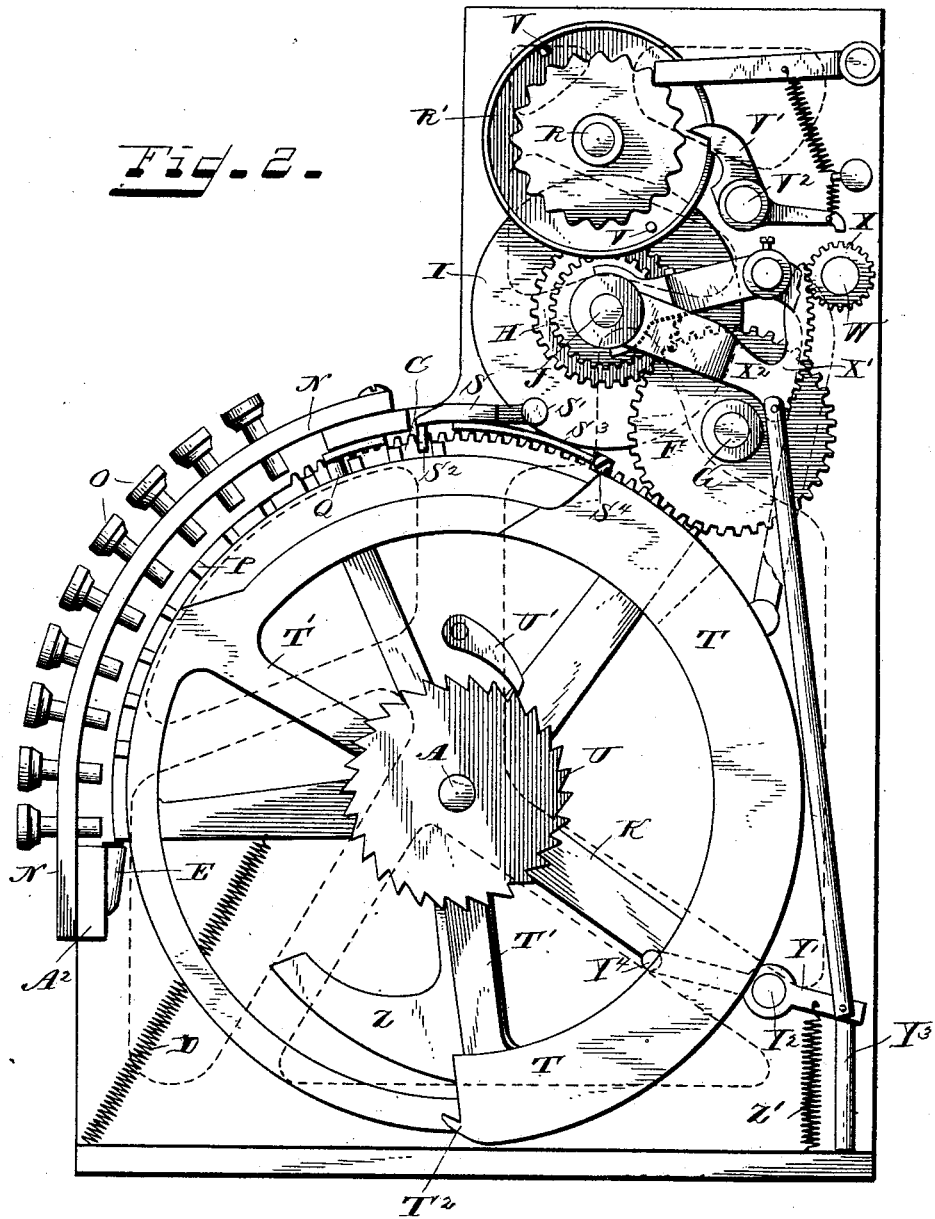
Figure 3:
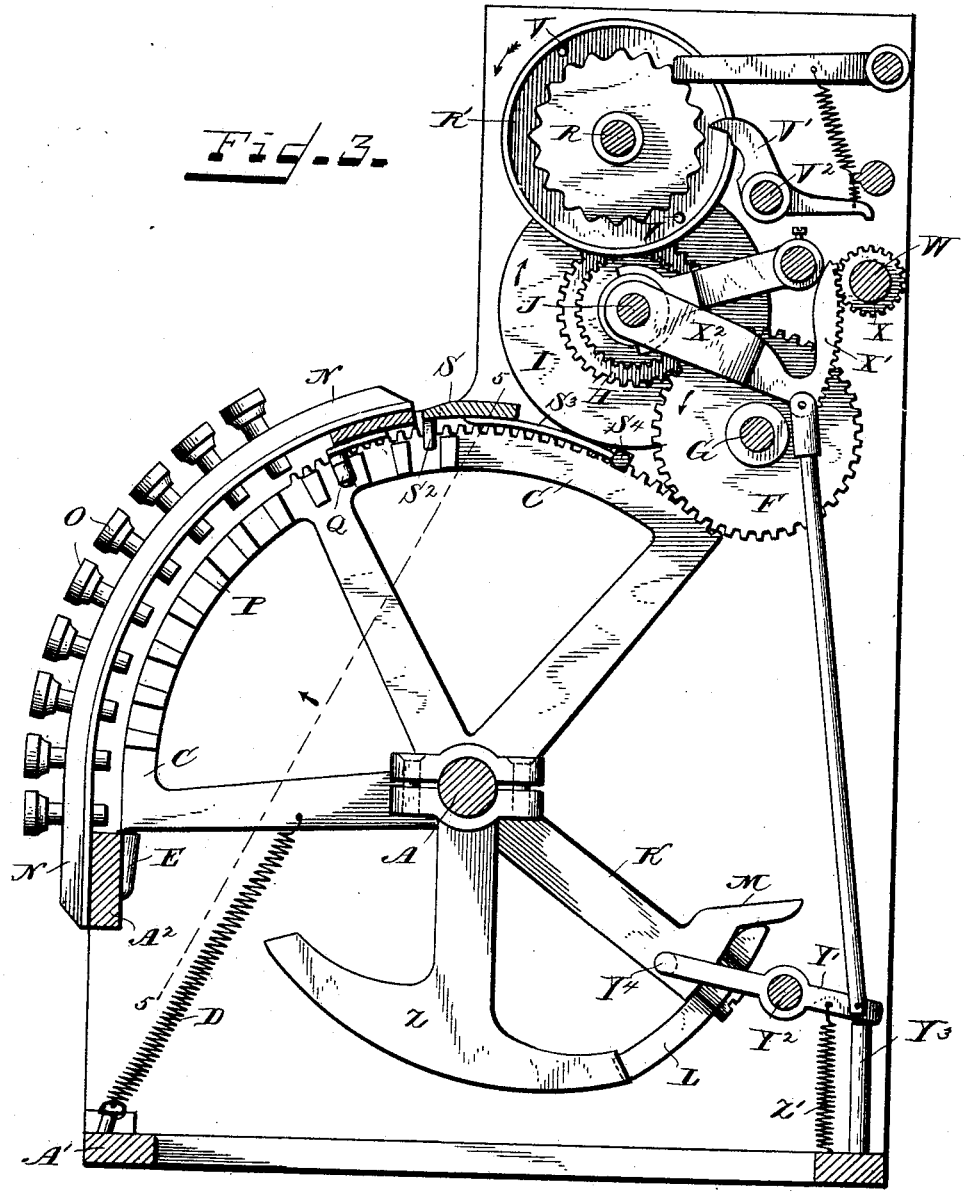
Figure 4:
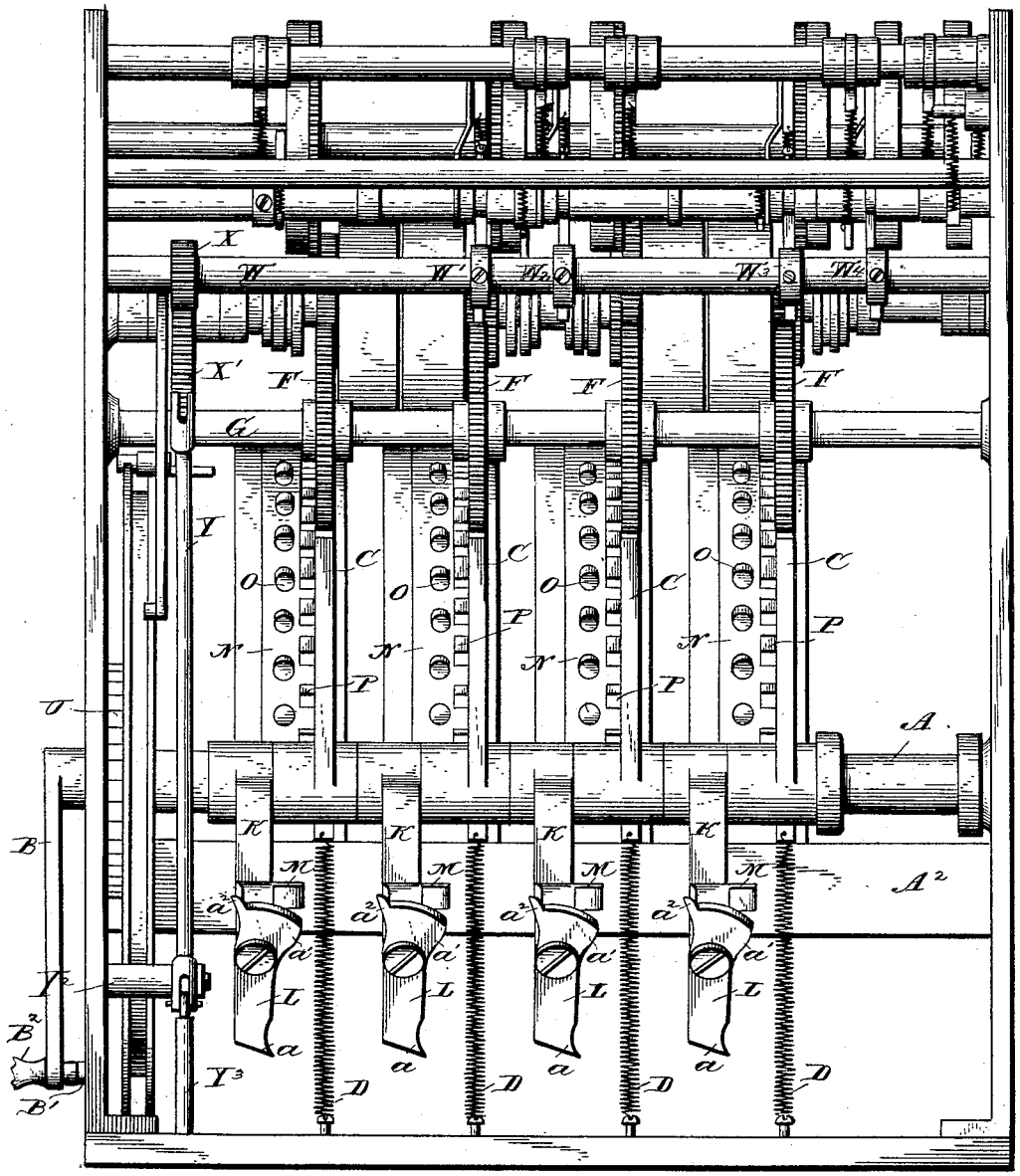
Figure 5:
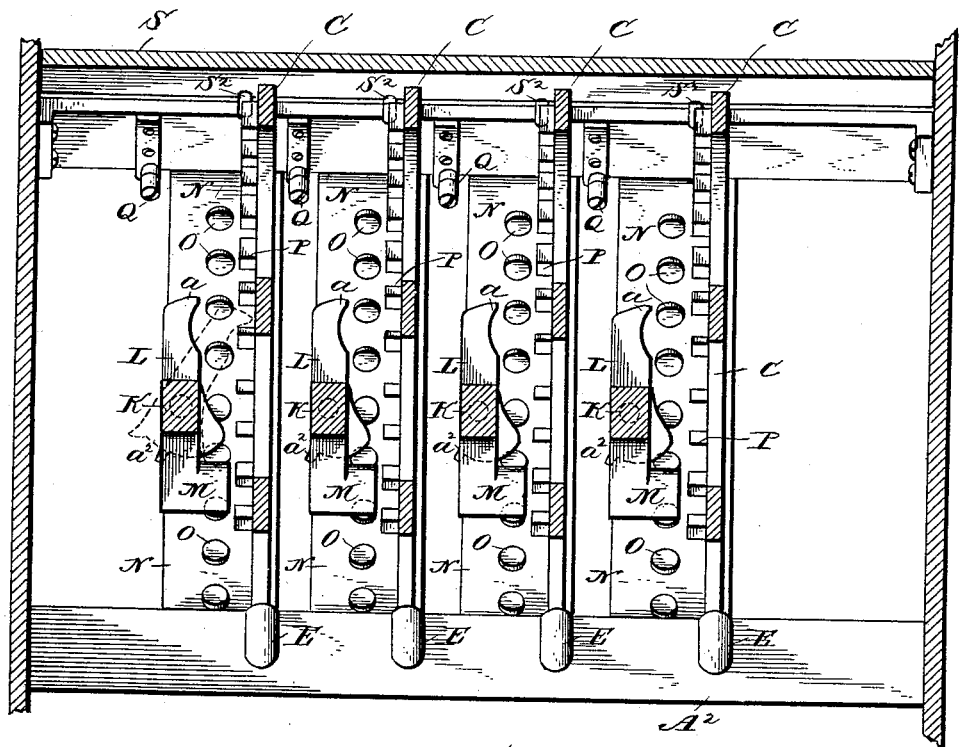
Figure 6:
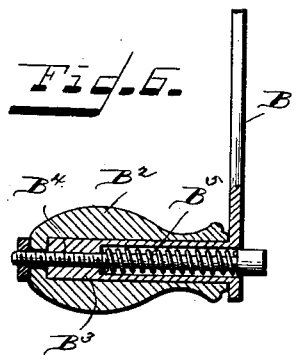
Figure 7:
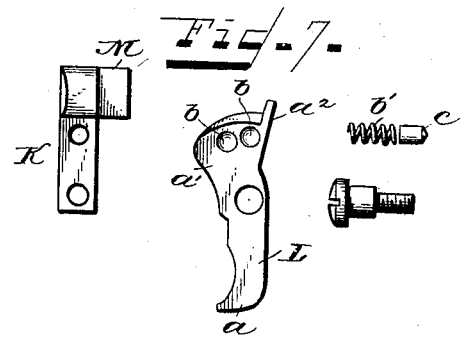

In the accompanying drawings, Figure 1 represents a front elevation of my improved machine removed from its casing; Fig. 2, a side elevation, with the rear side of the framework in dotted lines. Fig. 3 is a vertical section on the line 3 3 of Fig. 1, looking to the left of the machine; Fig. 4, a rear elevation; Fig. 5, a sectional view on the line 5 5 of Fig. 3, looking radially from the central shaft toward the middle of the arc of the circle formed by the inner ends of the rows of keys with the machine in operation, instead of at rest, as in the other figures. Fig. 6 is a detail of a portion of the operating-handle and its grasping-knob; Fig. 7, a detail of the inner face of one of the actuating-pawls, the end of the arm to which it is pivoted, and the interposed detent and spring.

The same letters of reference are used to indicate identical parts in all the figures.

The foundation of my improved machine may be said to consist of a main actuating device for the indicator and register, a series of keys, stops, or trips, and a hand-operated device having a uniform movement and co-operating with the main actuator and keys in such manner that it will become connected with the actuator at different points in its own uniform movement and move such actuator with it to a certain point, where it again becomes disconnected from the actuator and moves on alone. The points at which the hand-operated device becomes connected with the main actuator are determined by the several keys or stops, while the point of disconnection is always the same, so that if a given key be operated or set the movement of the hand-operated device will move the actuator, and consequently the indicator and register, a certain distance before reaching the disconnecting or releasing point, and if another key be set a full movement of the hand-operated device will move the actuator and the indicator and register a different distance. The several keys of the series represent different values, and are arranged in such order that a key of higher value will cause a connection of the hand-operated device with the main actuator at an earlier point in the movement of the former than will a key of lower value, and will consequently cause a full movement of such device to move the actuator and register a greater distance than will a key of lower value, the arrangement of the entire series of keys being such that when any one of them is operated or set it will cause the hand-operated device when given its full uniform movement to become connected with the main actuator at the proper time to move the indicator and register the necessary distance to indicate and register the exact value of such key.

The machine illustrated in the drawings is designed to indicate and register amounts from one cent to ninety-nine dollars and ninety-nine cents, and contains four series of keys, each containing nine keys representing multiples of one from one to nine, four main actuators, each co-operating with one of the series of keys, and one hand-operated device co-operating with all of the actuators and all of the series of keys by four separate connections. The main actuators are gear-toothed segments, the hand-operated device is a revoluble shaft having a handle applied to it for turning it, and the connections between the revoluble shaft and main actuators consist of pawls or dogs carried by arms supported upon and revolving with said shaft, each of said pawls being arranged to be thrown into engagement with teeth or projections upon its co-operating segment by moving one or another key of its series into the path of travel of the pawl, the relative position of such key in the series determining the point at which the pawl shall be thrown into engagement with the segment. The indicators are shown in the form of numbered wheels, one for each series of keys and geared to its corresponding actuator or segment, while the registering-wheels are so connected with the indicator-wheels that they turn with them in one direction but not in the other.

Having thus indicated the general nature of my improved machine, I will proceed to describe its construction more in detail.

A revoluble shaft A, having its bearings in the side plates of the frame-work, extends centrally across the machine and has an operating-handle B secured to its right-hand end, Fig. 1. Loosely mounted on this shaft by radial supporting-arms are the four segments C, Figs. 2, 3, 4, and 5, which I have termed the "main actuators." These segments are yieldingly held in their normal forward positions, shown in the drawings by spiral springs D, connected to their radial supporting-arms and to the lower front cross-piece A' of the frame-work. In this position the lower forward ends of the segments rest upon the lugs E upon the inner side of a middle front cross-piece $A^2$ of the frame-work, Fig. 3. The rear half of the periphery of each segment has gear-teeth cut upon it, and the racks thus formed mesh with gears F, loosely mounted upon a shaft G, which gears G in turn mesh with gears H, fastened upon the sides of the indicator-wheels I, which are loosely mounted upon a shaft J, parallel to the shaft G.

Fast upon the shaft A, one beside each segment or actuator C, are four arms or pawl-supports K of about the same length as the radial supporting-arms of the segments. Mounted upon the outer end of each of these arms, upon a pivot radial to the shaft A, is a pawl L, Figs. 3 and 4. The pivots of these pawls are near their middles, and the pawls have laterally-pointing toes $a$ at one end, while their opposite ends are widened and their edges form cam-surfaces $a'$ $a^2$, for a purpose to be hereinafter described. The inner face of the widened end of each pawl is provided with two adjacent recesses $b$ $b$, Fig. 7, while a socket in the outer end of the arm K, immediately beneath these recesses, contains a spiral spring $b'$ and a detent $c$, interposed between the spring and under surface of the pawl and adapted to engage one or another of the recesses $b$. When the pawl is rocked on its pivot to one position, the detent engages one recess $b$ and yieldingly holds the pawl in that position, and when the pawl is moved to another position the detent engages the other recess $b$ and yieldingly holds the pawl in the latter position. The outer ends of the arms K are also provided with integral wiper-blocks M, for a purpose to be presently explained.

The four series of operating-keys, Fig. 1, are mounted in segmental plates N, secured upon the front side of the frame-work. The keys O consist of short pins passed through holes in the plates N, and are provided with numbered push-buttons upon their outer ends. They are arranged substantially radial to the shaft A, and have limited play inward and outward in the guide-holes in the plates N. They fit snugly in said holes, so that when pushed inward they will remain in that position until positively moved outward, and vice versa; but to insure such retention in the position to which they may be moved I prefer to apply friction-springs to them. In the machine shown in the drawings such springs are contained in bores extending inward transversely from the left sides of the plates N to intersection with the key-holes, the springs being confined in the bores and held pressed against the sides of the keys by the screw-plugs $d$, (shown in Fig. 1,) as will be readily understood without further illustration.

As before stated, the radial arms K, which carry the pawls L, are of about the same length as the radial supporting-arms of the segments C, so that when the shaft A is given a revolution by the handle B the path of travel of the pawls L is adjacent to and parallel with the sides of the segment C. As shown in Figs. 4 and 5, the inner ends of the keys of each series also form a row parallel with and adjacent to the sides of their respective segments, but just outside the path of travel of the pawls L. The side of each segment next to its corresponding set of keys and the path of travel of its co-operating pawl L is provided with a series of lugs, projections, or teeth P, adapted to be engaged by the toe $a$ of its pawl, in the manner to be now described. From Fig. 5 it will be seen that when in normal position on the arms K the pawls L will travel freely past their respective segments when the shaft A is revolved and will not engage the lugs P upon the sides of the segments. It will also be seen that when in such position the toe $a$ of each pawl travels in a line just to the left of its row of keys, while the cam-surface $a'$ on the widened opposite end of the pawl travels in a line immediately beneath the inner ends of the keys. It results from this arrangement of the parts that when any key is pushed inward its inner end is brought into the path of travel of the cam-surface $a'$ of the pawl, and that the engagement of such surface with the side of the key, when the shaft A is revolved, will rock the pawl on its pivot and throw its opposite end to the right and cause the toe $a$ to enter between two of the lugs P upon the side of the segment. The further movement of the pawl as the shaft A continues to revolve will therefore carry the segment with it until the cam-surface $a^2$ upon the opposite side of the pawl strikes a pin Q, depending from the under side of a cross-piece of the frame-work. Its engagement with this pin will rock the pawl on its pivot back to normal position and disengage its toe from the lug upon the side of the segment. Just at this moment a locking-bar, hereinafter described, is thrown into engagement with the segment and prevents its spring D from pulling it back to normal position. After the operated key has thrown the pawl into engagement with the segment in the manner described the key is struck by the wiper-block M upon the end of the arm K, which carries the pawl, and is pushed outward to normal position again ready for another operation. The movement given to the segment by the dog L is transmitted through the gears F and H to the indicator-wheel I, corresponding to the series of keys to which the key operated belongs. The lowest key in each series is the key of highest value, and they decrease in value in regular order up to the uppermost key, which is of the lowest value in the series. It will be seen that the lower keys of the series, when pushed inward into the path of the pawls, will throw the latter into engagement with the segments earlier in the revolution of the shaft A than will the keys higher up in the series. As the pawls are always disengaged from their segments at the same point by the pins Q, it will be seen that the different positions of the keys O determine the extent of movement given by a pawl to its segment in one complete revolution of the shaft A. When the segments are in normal position with their forward ends resting upon the lugs E, the indicator-wheels I present their zeros at the reading opening or window in the casing which incloses the working parts of the machine, and the adjustment of the parts is such that when any key in any series is pushed in and the shaft A then revolved by its handle B the pawl L, co-operating with the series containing the operated key, will be thrown into engagement with its segment at the proper time to cause it to turn the segment and indicator-wheel just far enough to expose the number corresponding to the value of such key before the pawl is disengaged from its segment by a pin Q. When two or more keys in different series are pushed in at the same time to indicate a sale amounting to tens and units of cents or dollars and cents, the pawls L corresponding to the operated keys will all be thrown into engagement with their respective segments at the proper points to cause their indicator-wheels to be moved the exact distance necessary to indicate the values of the keys. Inasmuch as the segments become locked at the moment they are freed from the pawls, it will be understood that the indicator-wheels geared to the segments (through the gears F and H) also become locked, and their exposed numbers are thereby held in view to indicate the amount of the sale until the segments are unlocked and allowed to return to normal position. The segments are unlocked at the beginning of the next operation of the machine, as will be hereinafter explained, so that when one sale has been made and the machine operated to indicate and register its value the indication of such value remains in view until the machine is again operated to indicate another scale.

The registering-wheels R' R² R³, &c., are loosely mounted upon a shaft R, extending across the machine. They may be actuated either by the indicator-wheels I or directly by the segments C, in either event suitable ratchet and pawl or other devices being interposed in the connections to cause the registering-wheels to be turned in one direction with the segments or indicator-wheels, but not in the other. As such connections are old and well known in many forms, it is thought unnecessary to illustrate or describe them in detail here further than to say that in the machine shown in the drawings the registering-wheels are actuated by the indicator-wheels and not directly by the segments.

Any suitable form of laterally-displaceable stops may be combined with each series of keys to prevent more than one key of the series being operated at the same time, as is common in machines of this class.

The locking-bar before referred to for locking the segments from return movement when their actuating-pawls are disengaged from them by the trips Q is shown in end view at S in Fig. 2, in section in Fig. 3, and a portion of its under rear side in Fig. 5. It is pivotally supported at its opposite ends in the side frames of the machine, as at S' in Fig. 2, and has four pendent locking-lugs S² upon its forward edge, one for each segment C. When the rear side of the bar is lifted and its forward edge thrown downward, one of these lugs S² enters between two of the lugs P on each segment and locks all of the segments from turning in either direction. A spring (not shown) applied in any suitable manner constantly tends to move the forward edge of the bar upward and disengage its locking-lugs from the segments, the lugs being moved into engagement with the segments against the resistance of this spring. Projecting rearwardly from the bar at its right-hand end is an arm S³, Fig. 3, provided with a laterally-projecting pin S⁴, Fig. 2. This pin, which may carry a friction-roller, if desired, co-operates with a segmental cam-plate T, Fig. 2, supported by radial arms T', fast on the shaft A. When the operating-handle B of this shaft is in its normal position, as in Fig. 1, the cam-plate is in the position shown in Fig. 2, and the pin S⁴ upon the arm S³ of the locking-bar S is resting upon the periphery of the cam-plate near its upper end, and the front edge of the bar S is held down. When any key is operated and the handle is turned forward to make an indication and registration, the first movement of the handle carries the cam-plate from under the pin S⁴, whereupon the spring applied to the bar S immediately throws its forward edge upward, lifting its locking-lugs S² out of engagement with any segments with which they may have been engaged, and thereby permitting the springs D to pull said segments forward and downward to normal position and reset the indicator-wheels to zero. As the shaft A is further revolved by the handle B the beveled opposite end T² of the cam-plate T strikes the pin S⁴ just as the pawls which have been engaged with the segments are disengaged therefrom by the trips Q and lifts the pin S⁴ and arm S³ and throws down the forward edge of the bar S and causes its lugs S² to enter between two lugs P upon each of the segments to lock the latter, as before explained. In the further movement of the handle to normal position the periphery of the cam-plate holds the pin S⁴ up and the bar S in locking position until when the handle is brought to rest the pin S⁴ bears upon the plate just at its tail end, as seen at Fig. 2. It will thus be seen that the segments and indicator-wheels are positively locked from the time the pawls are disengaged from their co-operating segments until the handle is brought to its normal position of rest, and that when it is moved beyond such position at the beginning of a fresh operation of the machine the locking-bar is disengaged from the segments, and the latter and the indicator-wheels are immediately restored to normal position.

It is evident that the forward edge of the locking-bar S or the lugs thereon might be arranged to co-operate with the gear-teeth upon the segments instead of the lugs P thereon, in which case the gear-teeth would be extended farther forward upon the segments. It will also be understood that the operation of the cam-plate T and the spring relatively to the locking-bar may be reversed, the spring being arranged to yieldingly hold the bar in locking position and the cam-plate to throw and hold it out of such position at the proper time.

A ratchet U, fast upon the shaft A and co-operating with a pawl U', pivoted to the side frame of the machine, Fig. 2, serves to prevent the handle and shaft being turned in an opposite direction to that described.

As shown in Fig. 1, the operating-handle B in normal position rests against a stud B' upon the side of the frame-work. The grasping-knob B², as shown in Fig. 6, is loosely mounted upon a tube B³ integral with or secured to the side of the handle B near its end, the bore of the tube extending through said handle. Near its outer end the bore of the tube is contracted, and between the shoulder thus formed and the enlarged end of a rod B⁴, passed through the tube, is confined a spiral spring B⁵. A nut upon the outer end of the rod B⁴ holds the parts together. This construction permits the knob B² of the handle to be slid to the right on the tube B³ to withdraw the inner end of the rod B⁴ from engagement with the stud B' on the frame-work and permit forward movement of the handle. The spring B⁵ restores the knob and rod to their normal inner position when they are released, so that when the handle comes around to normal position again the inner end of the rod B⁴ will strike the lug B' and arrest the handle at the proper point. This particular construction of handle is not new, and I make no claim to it.

As before stated, I have not thought it necessary to illustrate or describe in detail the form of connection between the segments or indicator-wheels and the registering-wheels; nor do I deem it necessary to illustrate and describe in detail the particular construction of the transfer devices by which each of the registering-wheels records its revolutions or half-revolutions upon the next higher wheel, since I do not propose to claim the same in the present application. It will be sufficient to state that each registering-wheel bears upon its periphery two series of numbers, from 0 to 9, inclusive, and has projecting from its side two diametrically-opposite pins V, Figs. 2 and 3. As the wheel completes a half-revolution and brings one of its zeros to the reading-point, one of the pins V strikes an arm V', fast upon a rock-shaft V², and rocks said shaft. The rocking of the shaft V² sets the transfer-pawl, which co-operates with the ratchet of the next higher registering-wheel, so that when said pawl is actuated (by the means hereinafter described) it will turn its wheel one number to register the half-revolution of the lower wheel.

While the form and arrangement of the transfer-pawls and the means for setting them may be of any usual or suitable character, and need not, therefore, be described in detail, the means I have provided for actuating them after they have been set is novel, and as it has been incidentally illustrated in the drawings may be briefly described. Upon a shaft W, Fig. 4, journaled at its ends in the side frames of the machine, are secured a series of cams W' W², &c. This shaft is oscillated at each operation of the machine by means to be described, and when so oscillated the cams upon it will strike any pawls which have been set for transfer and cause them to turn their registering-wheels one number. Fast upon the shaft W, near its left-hand end, Fig. 4, is a pinion X, meshing with a segment-rack hung upon the shaft J, Figs. 2 and 3. A rod Y connects the lower end of the rack X' with the rear end of a lever Y', pivoted upon a stud Y³, projecting inwardly from the side frame of the machine. The rear end of the lever rests upon a stop-pin Y³, and its front end carries upon a laterally-projecting stud a friction-roller Y⁴. This roller is in the path of travel of a cam-plate Z, fast upon the shaft A, Fig. 3. When said shaft is revolved, the cam-plate strikes the friction-roller carried by the lever Y and depresses the front end of the lever, thereby raising its rear end and lifting the segment-rack X' and turning the shaft W. When the cam-plate passes the friction-roller and frees the lever Y', a spring Z' pulls down its rear end again and causes the segment-rack X' to turn the shaft back to normal position.

The cams W' W², &c., are arranged upon the shaft W in retreating order from left to right in Fig. 4, so that if several transfer-pawls be set at the same time when the shaft W is oscillated the transfer-pawl to the left will be first actuated by its cam, then the next pawl to the right, and so on with all that may be set. The purpose of this is to cause the transfer from one wheel to the next to be effected before the cam for the pawl of the next higher wheel (the third) reaches a position to act on its pawl, this being necessary to insure an accurate registration in some cases. For instance, if there be $19.95 registered upon the first four wheels and the machine be then operated to register five cents the result will be as follows: The addition of the five cents upon the wheel R' will bring the zero on that wheel to the reading-point and will set the transfer-pawl for the wheel R², but will not effect the pawls for the wheels R³ and R⁴. As the shaft W is then turned in the manner before described, its first cam W' will actuate the pawl for the wheel R² and turn that wheel one number, bringing its zero to the reading-point. This movement of the wheel R² will set the transfer-pawl for the wheel R³, and as the shaft W continues to turn the second cam W² will actuate said pawl and turn the wheel R³ one number and bring its zero to the reading-point. This movement of the wheel R³ will set the transfer-pawl for the wheel R⁴, and the continued movement of the shaft W will cause its third cam W³ to actuate this pawl and turn the wheel R⁴ one number, bringing its number 2 to the reading-point and making the total registry on the four wheels $20.00.

It will be understood from the position of the cam-plate Z upon the shaft A (shown in Fig. 3) that in the operation of the machine said cam does not engage the lever Y', and consequently does not begin to turn the shaft W until after the values of the operated keys have been added upon the registering-wheels and the pawls L disengaged from the main actuating-segments.

As I before stated, the principal feature of my invention consists in the combination of the main actuator, (the segment,) the hand-operated device, (the revoluble shaft or pawl supports,) the pawl, and the series of keys, co-operating in the manner described, and I do not wish to be limited to any particular form or arrangement of the elements entering into such combination. It will of course be understood that each main actuator and its co-operating keys form a distinct combination with the hand-operated device; and my invention contemplates the use of one set of these parts alone, as well as the use of several together. It will also be understood that the arms K are simply supports for the pawls L, and that said pawls may be mounted upon any other suitable form of support by which they may be given the requisite movement.

Having thus fully described my invention, I claim—

1. In a registering-machine, the combination of a main actuator, a hand-operated device capable of connection with and disconnection from the main actuator, a series of keys for said actuator mounted independently thereof, whose relative positions determine the points at which the hand-operated device shall become connected with the main actuator, and means for disconnecting it therefrom at a fixed point, substantially as described.

2. In a registering-machine, the combination of a main actuator, an indicator operated thereby, a hand-operated device capable of connection with and disconnection from the main actuator, a series of keys for said actuator mounted independently thereof, whose relative positions determine the points at which the hand-operated device shall become connected with the main actuator, means for disconnecting it therefrom at a fixed point, and a lock for automatically locking the main actuator at the point of disconnection from the hand-operated device, substantially as described.

3. In a registering-machine, the combination of a main actuator, an indicator operated thereby, a hand-operated device capable of connection with and disconnection from the main actuator, a series of keys whose relative positions determine the points at which the hand-operated device shall become connected with the main actuator, means for disconnecting it therefrom at a fixed point, a lock for automatically locking the main actuator at the point of disconnection from the hand-operated device, and means for releasing the actuator at the next forward movement of the hand-operated device, substantially as described.

4. In a registering-machine, the combination of a main actuator, an indicator and a register operated thereby, a hand-operated device capable of connection with and disconnection from the main actuator, a series of keys for said actuator, whose relative positions determine the points at which the hand-operated device shall become connected with the main actuator, and means for disconnecting it therefrom at a fixed point, substantially as described.

5. In a registering-machine, the combination of an actuating-segment, a pawl carried by a suitable support and movable in a path of travel adjacent to the segment and capable of being engaged with and disengaged from the segment, a series of keys independent of said segment, arranged to throw the pawl into engagement with the segment at different points, and a trip for disengaging the pawl from the segment at a fixed point.

6. In a registering-machine, the combination of an actuating-segment, an indicator geared thereto, a revoluble pawl-support, a pawl carried thereby and capable of being engaged with and disengaged from the segment, a series of keys arranged to throw the pawl into engagement with the segment at different points, a trip for disengaging it therefrom at a fixed point, and a lock for automatically locking the segment when the pawl is disengaged from it to hold the indicator in the position to which it is moved by the segment.

7. In a registering-machine, the combination of an actuating-segment, an indicator geared thereto, a revoluble pawl-support, a pawl carried thereby and capable of being engaged with and disengaged from the segment, a series of keys arranged to throw the pawl into engagement with the segment at different points, a trip for disengaging it therefrom at a fixed point, a lock for automatically locking the segment when the pawl is disengaged from it, means for automatically releasing the segment at the next forward movement of the revoluble shaft, and a resetting-spring for the segment.

8. In a registering-machine, the combination of an actuating-segment, an indicator-wheel and a register-wheel geared thereto, a revoluble arm or pawl-support, a pawl carried by said arm and capable of being engaged with and disengaged from the segment, a series of keys arranged to throw the pawl into engagement with the segment at different points, and a trip for disengaging it therefrom at a fixed point.

9. In a registering-machine, the combination of the segment C, revoluble shaft A, arm K, fast on the shaft A and carrying pawl L, keys O, mounted independently of the actuator, and stationary trip Q, situated at a predetermined point.

10. In a registering-machine, the combination of the segments C, indicator-wheels I, geared thereto, revoluble shaft A, arms K, fast on shaft A and carrying pawls L, a series of keys O for each segment, fixed trips Q, and locking-bar S.

11. In a registering-machine, the combination of the segments C, indicator and register wheels geared thereto, revoluble shaft A, arms K, fast on the shaft A and carrying pawls L, keys O, locking-bar S, cam T, fast on the shaft A, and resetting-springs D for the segments C.

12. In a registering-machine, the combination, with the registering-wheels and transfer-pawls therefor, of the shaft W, cams W' W², &c., and pinion X thereon, rack X', meshing with the pinion X, lever Y', connecting-rod Y, and operating-cam Z.

FRANK J. PATTERSON.

Witnesses:
THOMAS CORWIN,
CHARLES R. GILLIES.